(12) United States Patent
Taghizadeh-Kaschani

(10) Patent No.: US 7,426,239 B2
(45) Date of Patent: Sep. 16, 2008

(54) METHOD AND TRANSMISSION APPARATUS FOR TRANSMITTING A BIVALENT SIGNAL

(75) Inventor: Karim-Thomas Taghizadeh-Kaschani, Poing (DE)

(73) Assignee: Infineon Technologies AG, Munich (DE)

( * ) Notice: Subject to any disclaimer, the term of this patent is extended or adjusted under 35 U.S.C. 154(b) by 830 days.

(21) Appl. No.: 10/613,369

(22) Filed: Jul. 3, 2003

(65) Prior Publication Data

US 2004/0005009 A1   Jan. 8, 2004

(30) Foreign Application Priority Data

Jul. 3, 2002   (DE) .................. 102 29 860

(51) Int. Cl.
  *H04L 27/00* (2006.01)
  *H03K 19/0175* (2006.01)
  *G01R 29/02* (2006.01)

(52) U.S. Cl. .................... 375/259; 326/82; 327/31

(58) Field of Classification Search ......... 375/256–260, 375/224, 268, 282, 285, 296, 300; 326/82, 326/86, 56; 370/448, 462; 455/509; 327/31
See application file for complete search history.

(56) References Cited

U.S. PATENT DOCUMENTS

| | | | | |
|---|---|---|---|---|
| 4,027,152 A * | 5/1977 | Brown et al. ............... 398/190 |
| 4,063,220 A * | 12/1977 | Metcalfe et al. ............ 370/462 |
| 4,234,952 A * | 11/1980 | Gable et al. ................ 370/448 |
| 4,633,473 A * | 12/1986 | Ratchford et al. ............ 714/4 |
| 4,811,359 A | 3/1989 | Nakajima et al. |
| 5,450,611 A * | 9/1995 | Bonvallet et al. ........... 455/509 |
| 5,596,570 A * | 1/1997 | Soliman .................... 370/252 |
| 5,754,552 A | 5/1998 | Allmond et al. |
| 5,952,849 A * | 9/1999 | Haigh ....................... 326/82 |
| 6,262,600 B1 * | 7/2001 | Haigh et al. ................ 326/82 |
| 2002/0094785 A1 * | 7/2002 | Deats ...................... 455/67.3 |
| 2005/0163247 A1 * | 7/2005 | Vlasov et al. .............. 375/268 |
| 2006/0269002 A1 * | 11/2006 | Feldtkeller ................ 375/258 |

FOREIGN PATENT DOCUMENTS

WO   01/31796 A2   5/2001

* cited by examiner

*Primary Examiner*—Mohammad Ghayour
*Assistant Examiner*—Lawrence B Williams
(74) *Attorney, Agent, or Firm*—Laurence A. Greenberg; Werner H. Stemer; Ralph E. Locher

(57) ABSTRACT

A method and an apparatus for transmitting information contained in a transmission signal via at least one channel includes a number of processing steps at the transmitter end. At least one pulse sequence with at least one pulse is produced as stipulated by the transmission signal. The pulse sequence is output to the at least one channel. The channel is monitored for the presence of an interference signal. If an interference signal is detected on the channel, the pulse sequence is repeated.

10 Claims, 11 Drawing Sheets

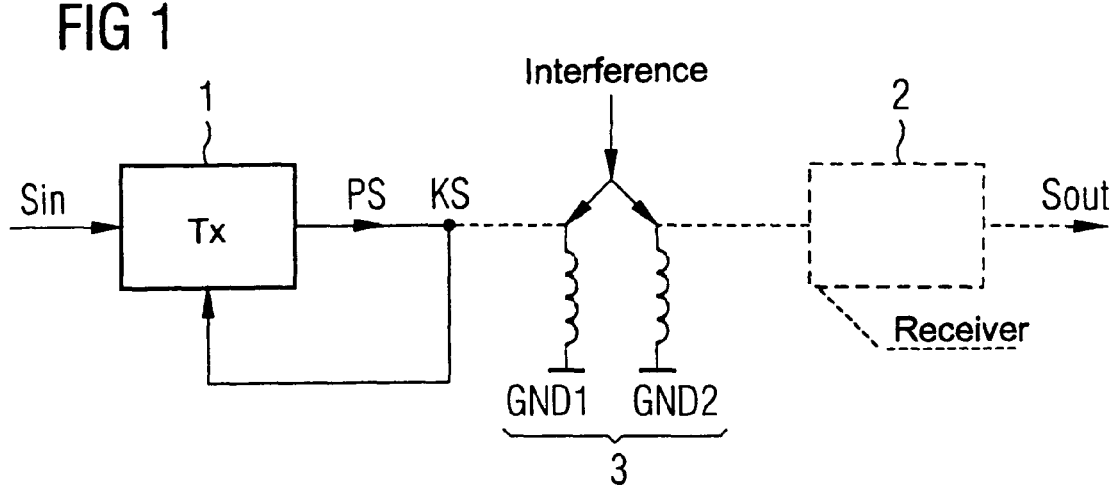
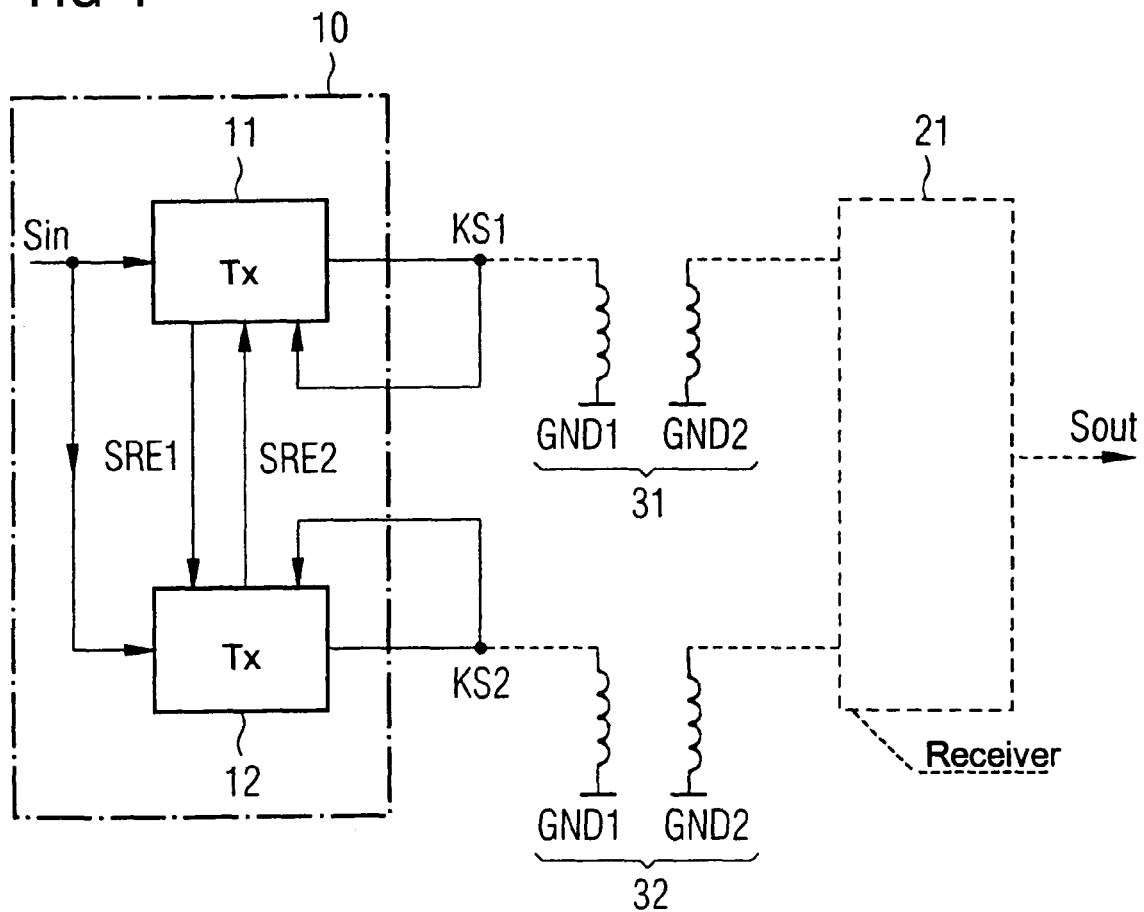

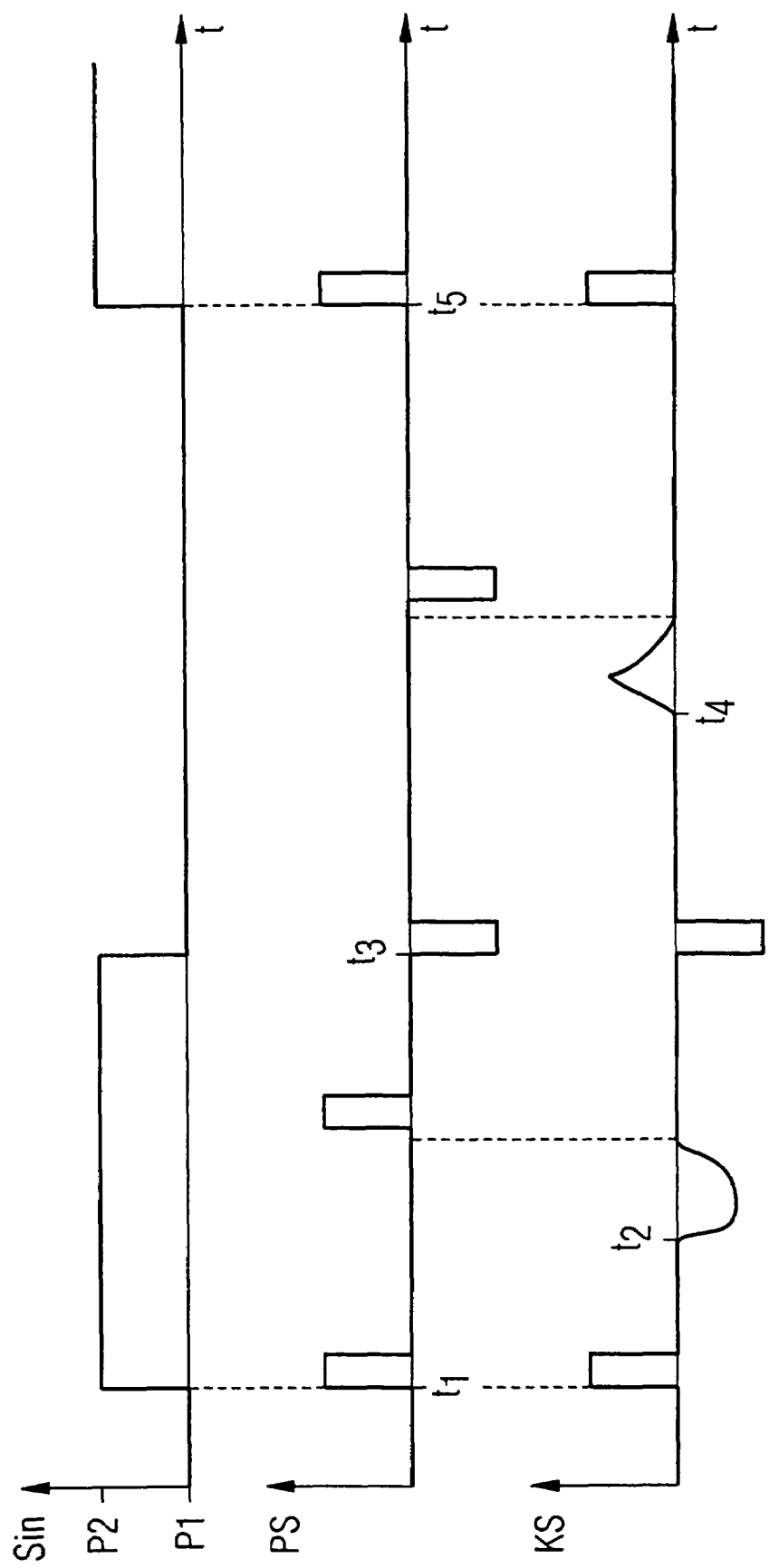

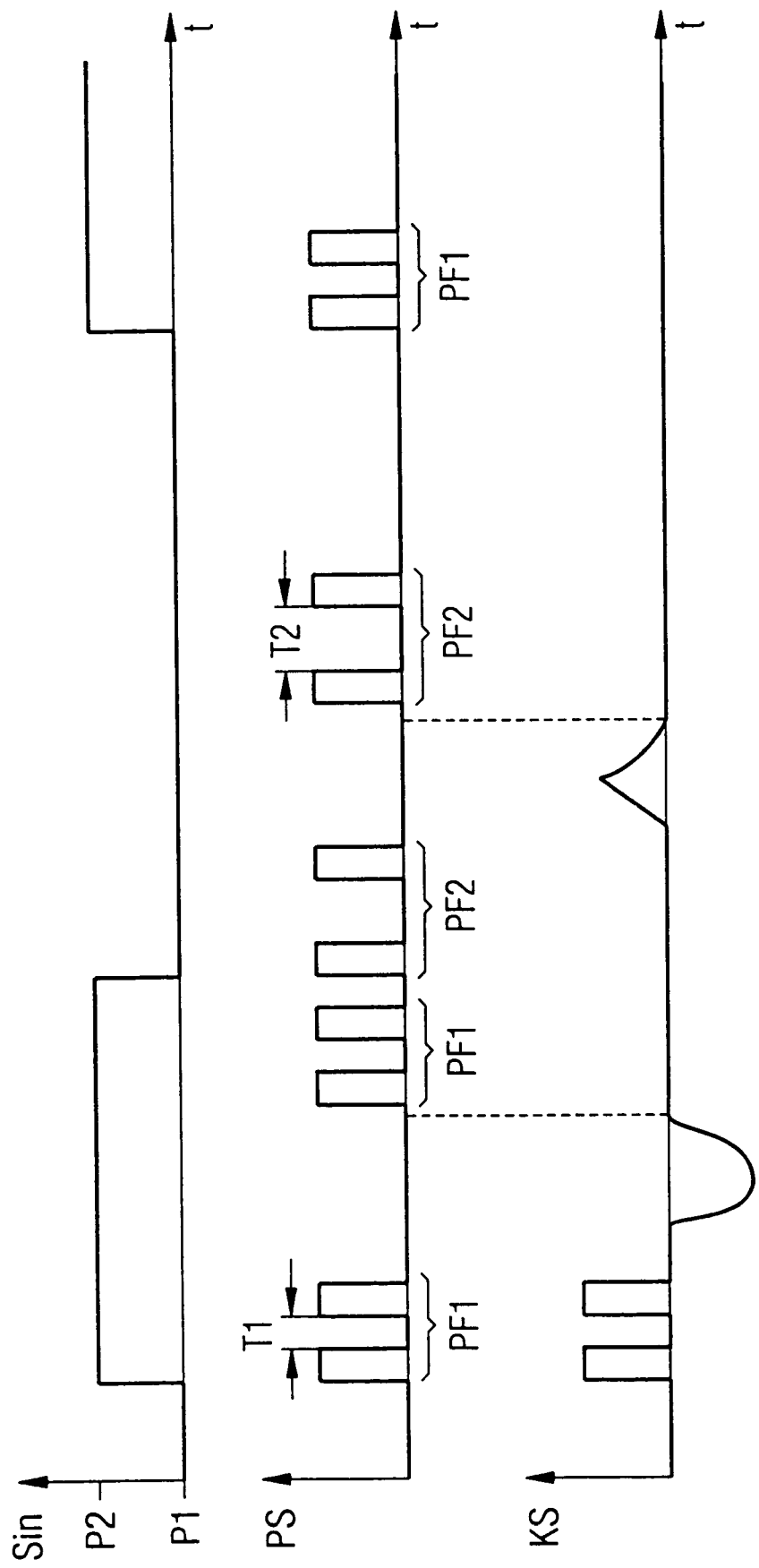

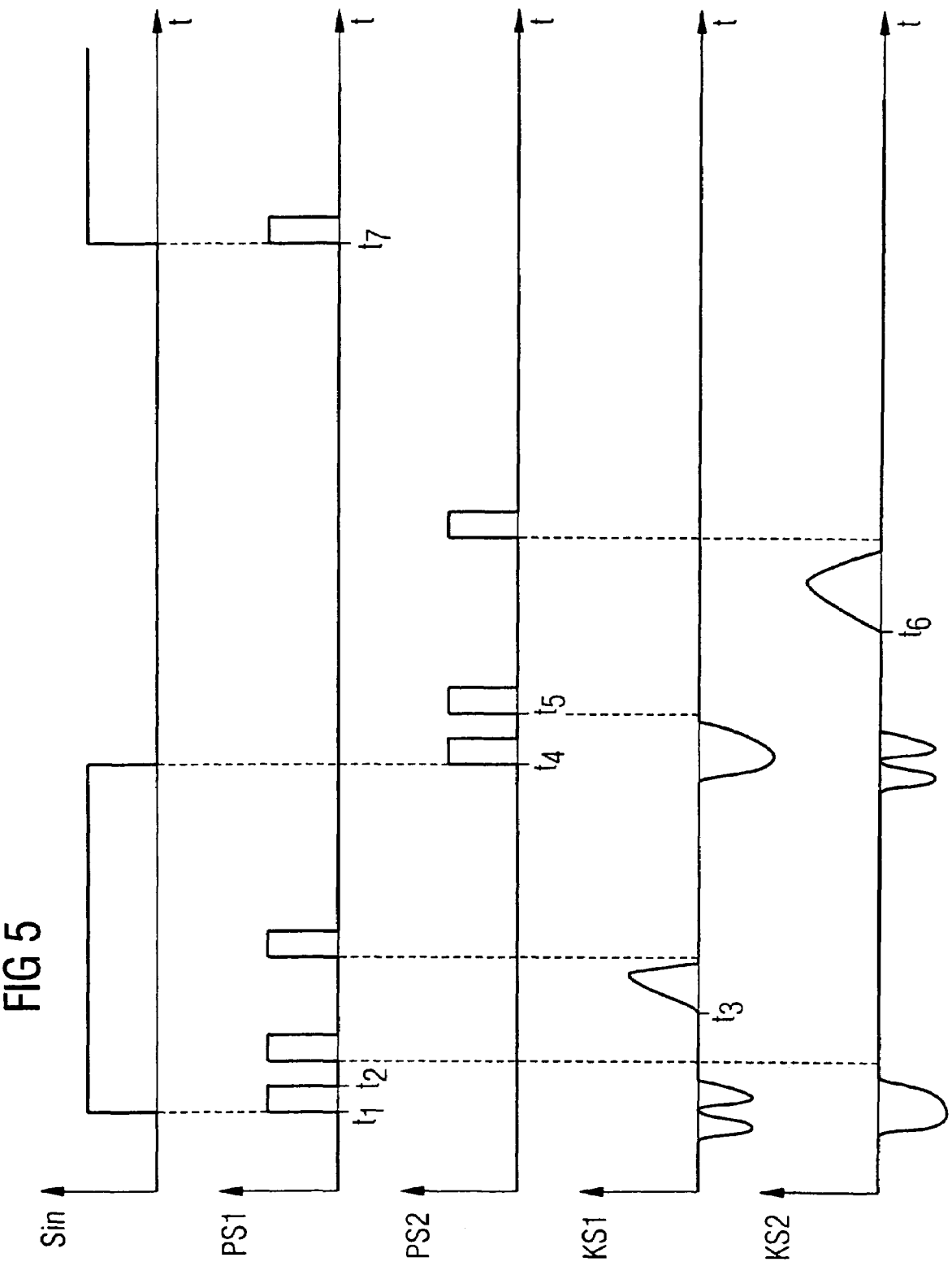

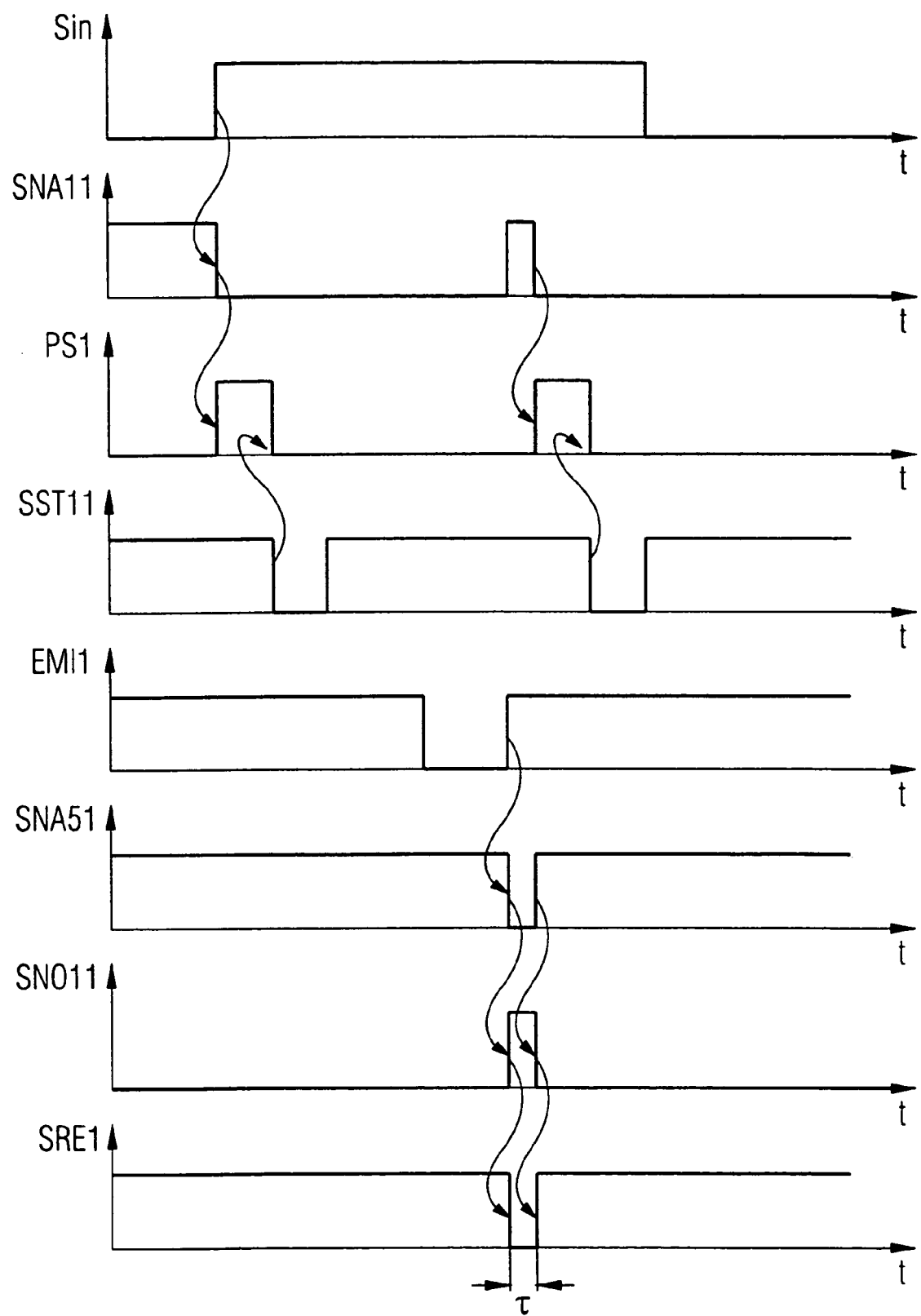

METHOD AND TRANSMISSION APPARATUS FOR TRANSMITTING A BIVALENT SIGNAL

BACKGROUND OF THE INVENTION

Field of the Invention

The present invention relates to a method and a transmission apparatus for transmitting at least one signal via a channel, in particular via a channel containing a potential barrier.

In electrical circuits, it is often necessary to transmit electrical signals via a channel which contains a potential barrier in order to isolate the potentials of a circuit which generates the electrical signal and a circuit which receives the electrical signal or is actuated thereby. Examples of such circuits are signal transmitters in communications technology, DC-isolated transmission interfaces in industrial electronics, or switched-mode converters in the form of flyback converters, for which a control signal dependent on the output voltage from the switched-mode converter needs to be transmitted to an actuating circuit actuating a switch. Another example are driver circuits for power transistors, particularly for "high-side switches", where control signals from a microcontroller, which normally have voltage levels of 3.3 V or 5 V with respect to a reference-ground potential, need to be transmitted to a driver circuit, which operate at much higher voltages or at a different reference-ground potential.

With methods for transmitting electrical signals via potential barriers, it is fundamentally known practice to transmit the signal from the transmitter end of the barrier to the receiver end of the potential barrier using capacitive, inductive or optical coupling methods.

The signal transmission via such potential barriers can be disturbed from the outside, however. Thus, greatly variable electrical or magnetic fields can result in the signal to be transmitted being disturbed or corrupted, or in the channel becoming completely blocked if an interference signal has such high power that the useful signal to be transmitted is completely extinguished.

If, by way of example, a bivalent signal is to be transmitted via such a potential barrier, then it is possible, as disclosed in U.S. Pat. No. 4,027,152, to convert the bivalent signal into a pulse sequence, with a positive pulse being transmitted if the level of the signal to be transmitted changes from a logic zero to a logic one and with a change in the level from a logic one to a logic zero entailing transmission of a negative pulse. These positive or negative pulses are repeated or refreshed at regular intervals of time, provided that the bivalent signal does not change its level in the interim. If an interference pulse means that "misinformation" is transmitted to the receiver in the course of these methods, then a correction is made upon the next refresh pulse.

Other methods in which a pulse or a pulse sequence is transmitted again in order to avoid errors at the receiver end are known from U.S. Pat. Nos. 5,952,849 and 6,262,600 B1, for example. The method disclosed in U.S. Pat. No. 6,262,600 B1 for transmitting a bivalent signal via a potential barrier involves the generation of a cyclic signal whose frequency assumes two different values on the basis of the present level of the signal which is to be transmitted.

In the prior art methods, a pulse or pulse sequence generated from the transmission signal which is to be transmitted is transmitted again at regular intervals of time, regardless of whether interference is occurring on the transmission channel. This practice signifies a not inconsiderable involvement of energy, since energy is required for each pulse sequence which is to be transmitted again or for each pulse which is to be transmitted again. In addition, a signal with interference is first corrected by the next refresh pulse. In the worst case, the period of time elapsing up to that point is equivalent to the period duration of the refresh pulses.

SUMMARY OF THE INVENTION

It is accordingly an object of the invention to provide a method and an apparatus for transmitting a signal via a channel, which overcomes the above-mentioned disadvantages of the heretofore-known devices and methods of this general type and which ensure a high level of insensitivity to interference on the channel while reducing energy consumption.

With the foregoing and other objects in view there is provided, in accordance with the invention, a method for transmitting information contained in a transmission signal via at least one channel. The novel method comprises the following steps, to be performed at a transmitter end:

generating at least one pulse sequence with at least one pulse as stipulated by the transmission signal;

outputting the pulse sequence to the at least one channel;

monitoring the channel for a presence of an interference signal; and repeating the pulse sequence if an interference signal is detected on the channel.

In other words, the method according to the invention for transmitting information held in a transmission signal via at least one channel makes provision, at the transmitter end, for at least one pulse sequence comprising at least one pulse to be generated as stipulated by the transmission signal and for the pulse sequence to be output to the at least one channel. In addition, the channel is monitored for the presence of an interference signal, and the pulse sequence is transmitted again if an interference signal is detected on the channel.

In the case of the inventive method, the pulse sequence dependent on the transmission signal is refreshed, that is to say is retransmitted, according to need only if interference is detected on the channel. By contrast with known methods, this reduces the energy involvement of the inventive method. An interference pulse on the channel can cause an error at the receiver end which is corrected again by virtue of the pulse sequence being transmitted again when an interference pulse arises.

During interference signal detection, it is not possible to distinguish what is the cause of the interference on the channel. The inventive method can thus also be used, in conjunction with a suitable receiver, to use interference brought about by the receiver on the channel to provoke a transmission pulse from the transmitter and hence to request the present transmitter state.

Preferably, following detection of the interference signal, the at least one pulse sequence is not transmitted until after the interference signal has subsided, that is to say when no further interference signal is detected.

In accordance with an added feature of the invention, the detection of an interference signal before the pulse sequence dependent on the transmission signal has even been transmitted for the first time entails the pulse sequence not being transmitted until after the interference signal has subsided.

In addition, one embodiment involves the pulse sequence, following detection of an interference signal, not being transmitted again until after transmission of the pulse sequence dependent on the transmission signal has ended, or when, if there are a plurality of channels, transmission has ended on all channels.

If just one transmission channel is available for carrying out the inventive transmission method, then interference signal detection needs to be interrupted when the pulse sequence is transmitted so as not to detect the pulse sequence resulting from the transmission signal incorrectly as an interference signal.

In order to be able to perform interference signal detection on a permanent basis, one embodiment of the invention provides for a first and a second transmission channel to be provided, with a first pulse sequence, which comprises at least one pulse, being generated as stipulated by the transmission signal and being transmitted via the first channel, and with a second pulse sequence, which comprises at least one pulse, being generated with a time stagger with respect to the first pulse sequence and being transmitted via the second channel. Since the first and second pulse sequences are generated with a time stagger with respect to one another, it is ensured that it is always possible to monitor one of the two channels for the occurrence of interference signals, with the information obtained from this monitoring being able to be used for repeating pulse sequences on both channels. In this context, use is made of the insight that interference signals normally influence both channels to the same extent, which means that interference identified on the channel on which no pulse sequence is currently being transmitted can be used for the other channel in order to repeat the pulse sequence currently being transmitted when the interference arises. In this embodiment, the first pulse sequence is thus transmitted again following an interference signal detected on the first and/or second channel, and the second pulse sequence is transmitted again following an interference signal detected on the second and/or first channel.

In another embodiment, provision is made for interference signal detection not to be performed on one of the transmission channels, but rather for a separate sensor to be used for this purpose which can be designed in the manner of a transmission channel which is actually not used for transmitting useful signals.

The inventive method can be used for any transmission signals which can stipulate that a pulse sequence comprising at least one pulse be generated.

The transmission signal can be, by way of example, a bivalent signal which has a first or a second signal level and is used as a control signal for a load arranged at the receiver end of the channel. In the case of such bivalent signals, the fundamental information is held in the change of signal level, as is known, which means that transmission of the information requires only transmission of a suitable pulse after such a change of signal level.

In one embodiment of the method, in which only one transmission channel is provided, a change in the signal level of the transmission signal from the first signal level to the second signal level, for example, entails a pulse which is positive with respect to a reference-ground potential being generated and transmitted, and a change in the signal level of the transmission signal from the second signal level to the first signal level entails a pulse which is negative with respect to a reference-ground potential being generated and transmitted. If an interference signal is detected on the channel between these pulses, then the respective pulse is repeated, provided that the level of the transmission signal has not changed in the interim.

The method can naturally also be used for pulse-code-modulated transmission methods, in which pulse sequences with more than one pulse each are generated on the basis of a transmission signal. Thus, a change in the signal level of the transmission signal from the first to the second level entails a first pulse sequence, which comprises a plurality of pulses, being generated and transmitted, and a change in the signal level of the transmission signal from the second to the first level entails a second pulse sequence, which comprises a plurality of pulses, being generated and transmitted, the first and second pulse sequences being different. A respective one of these two pulse sequences is transmitted again following detection of an interference signal on the channel.

In one embodiment of the method, in which a first transmission channel and a second transmission channel are available, a change in the signal level of the transmission signal from the first signal level to the second signal level entails the first pulse sequence, which comprises at least one pulse, being generated and being transmitted via the first channel, and a change in the signal level of the transmission signal from the second signal level to the first signal level entails the second pulse sequence, which comprises at least one pulse, being generated and being transmitted by the second channel. The first and second pulse sequences can in this case match in terms of their form, that is to say in terms of the number of pulses and the progression over time.

The at least one pulse sequence, which, in line with the inventive method, is transmitted again following detection of an interference signal, can naturally be dependent on the plurality of transmission signals and can comprise almost any number of pulses, provided that the duration of the pulse sequence is shorter than the interval of time at which level changes occur in the transmission signal which is to be transmitted.

The method according to the invention is particularly suitable for transmission via a channel that has an inductive coupling element or a transformer, particularly a coreless transformer.

With the above and other objects in view there is also provided, in accordance with the invention, a transmission apparatus, comprising:

an input terminal for receiving at least one transmission signal, and at least one output terminal to be coupled to a transmission channel;

at least one pulse-generating circuit connected between said input terminal and said output terminal, said pulse-generating circuit having at least one actuating input and generating a pulse sequence with at least one pulse as stipulated by the transmission signal; and an interference signal detection circuit connected to said pulse-generating circuit, said interference signal detection circuit providing an actuating signal causing the pulse-generating circuit to generate the pulse sequence again as stipulated by the actuating signal.

In other words, the novel transmission apparatus has an input terminal for supplying at least one transmission signal, and at least one output terminal which can be coupled to a transmission channel, with the input terminal and the output terminal having at least one pulse-generating circuit, having an actuating input, connected between them which generates a pulse sequence having at least one pulse as stipulated by the transmission signal. The output terminal of the transmission apparatus and the actuating input on the pulse-generating circuit have an interference signal detection circuit connected between them which provides an actuating signal for the pulse-generating circuit, with the pulse-generating circuit generating the pulse sequence again as stipulated by the actuating signal.

In one embodiment, the interference signal detection circuit in the transmission apparatus comprises a detector circuit, connected to the output terminal of the transmission apparatus, and an actuating-signal-generating circuit, connected downstream of the detector circuit. The detector circuit connected to the channel monitors the channel for the occurrence of interference signals and provides an output signal, on the basis of which the actuating-signal-generating circuit provides the actuating signal.

Preferably, the actuating-signal-generating circuit additionally generates the actuating signal on the basis of the at least one pulse sequence which is generated by the pulse-generating circuit and is transmitted to the channel, in order to ensure that no repetition of the pulse sequence is started during a period of time in which a pulse sequence is currently being output to the channel.

It is also possible to disable the detector circuit for interference signal detection during the period of time in which a pulse sequence is being output to the channel, in order to prevent the pulse sequence which results from the transmission signal and is being transmitted for the first time or again from being incorrectly detected as an interference signal. Instead of the detector circuit, it is also possible to disable the actuating signal generating circuit during transmission of a useful pulse, in order to prevent, during transmission of a useful pulse sequence, the useful pulse sequence itself from being taken as grounds for repeated transmission.

A transmission apparatus in line with one embodiment of the invention comprises a first output terminal, which can be coupled to a first channel, and a second output terminal, which can be coupled to a second channel, with the input terminal and the first output terminal having a first pulse-generating circuit connected between them, and the input terminal and the second output terminal having a second pulse-generating circuit connected between them. In this case, the first output terminal and the control input on the first pulse-generating circuit have a first interference signal detection circuit, which provides a first actuating signal, connected between them, and the second output terminal and the control input on the second pulse-generating circuit have a second interference signal detection circuit, which provides a second actuating signal, connected between them.

In this transmission apparatus, which is suitable for transmission via two channels, one of the two channels is always being monitored for the occurrence of interference signals, with the first pulse-generating circuit providing the first pulse sequence again as stipulated by the first actuating signal, that is to say on the basis of detection of an interference signal on the first channel, and as stipulated by the second actuating signal, that is to say on the basis of detection of an interference signal on the second channel, and outputting it to the channel. Preferably, the second pulse-generating circuit also provides the second pulse sequence again as stipulated by the second actuating signal and as stipulated by the first actuating signal, and outputs it to the channel.

In addition, in one embodiment of the inventive transmission apparatus, the first interference signal detection circuit generates the first actuating signal as stipulated by the second status signal, this status signal indicating whether a second pulse sequence is currently being transmitted via the second channel, so that it is possible to ensure that the first pulse sequence is not transmitted again until signal transmission has also ended on the second channel. In addition, the second interference signal detection circuit generates the second actuating signal as stipulated by a first status signal, which indicates whether a first pulse sequence is currently being transmitted to the first channel.

In one embodiment of the inventive transmission apparatus, the at least one pulse-generating circuit generates the pulse sequence after a prescribed edge of the input signal and repeats the pulse sequence preferably after a prescribed edge of the actuating signal and at a prescribed level of the input signal.

Other features which are considered as characteristic for the invention are set forth in the appended claims.

Although the invention is illustrated and described herein as embodied in a method and transmission apparatus for transmitting a bivalent signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a transmission system for data transmission via a channel that contains a potential barrier;

FIG. 2 plots exemplary signal profiles for a transmission signal (Sin), for a pulse sequence (PS) and for a signal (KS) detected on a first channel in a first embodiment of an inventive method;

FIG. 3 plots exemplary signal profiles for a transmission signal (Sin), for a pulse sequence (PS1) which is to be transmitted via a channel and for a signal (KS) detected on the channel in a further embodiment of the inventive method;

FIG. 4 is a block diagram of a transmission system for data transmission via a first and a second channel which each contain a potential barrier;

FIG. 5 plots exemplary signal profiles for a transmission signal (Sin), for a first pulse sequence (PS1) which is to be transmitted via a first channel, for a second pulse sequence (PS2) which is to be transmitted via a second channel, for a signal (KS1) detected on the first channel and for a signal (KS2) detected on the second channel in a second embodiment of the method according to the invention;

FIG. 11 shows exemplary time profiles for some of the signals arising in the pulse-generating circuit and in the interference signal detection circuit shown in FIG. 8;

DESCRIPTION OF THE PREFERRED EMBODIMENTS

Figure 6:
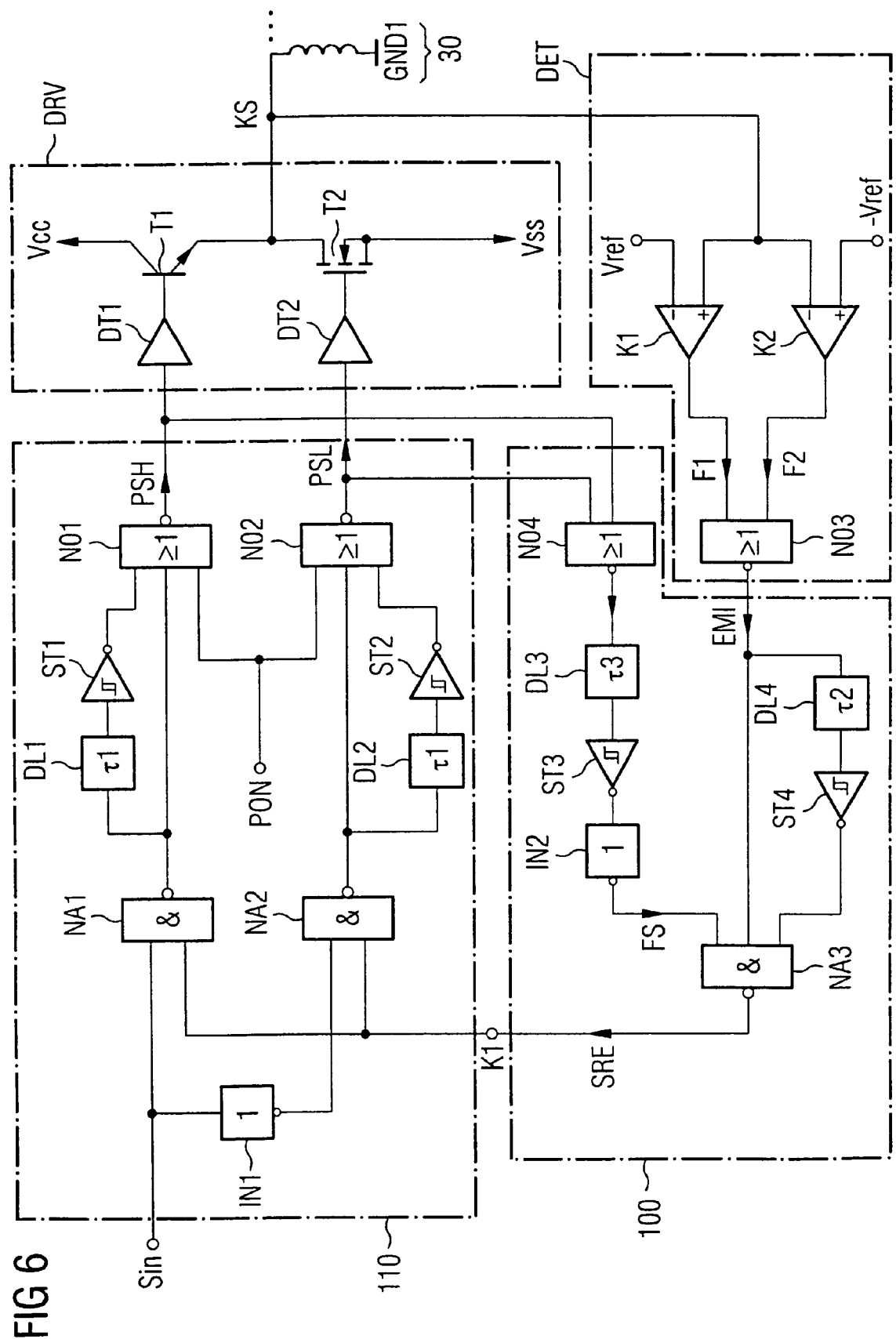
FIG. 6 is a schematic block diagram of a novel transmission apparatus for carrying out a method as shown in FIG. 2.

Referring now to the figures of the drawing in detail and first, particularly, to FIG. 1 thereof, there is shown a transmission system for transmitting a transmission signal Sin via a channel which, in the exemplary embodiment, has a transformer 3. In the exemplary embodiment, the transformer comprises two inductively coupled coils or windings which are connected to different reference-ground potentials GND1, GND2. The transmission system comprises a transmission apparatus 1 to which the transmission signal Sin is supplied and which outputs a signal, particularly a pulse sequence PS, to the channel. The receiver end of the channel has a receiver 2 which generates, from a signal received via the channel, an output signal Sout that matches the transmission signal Sin when the channel is free of interference.

On the transmitter-end section of the channel, it is possible to detect a signal KS present on the channel, this signal KS being able to be dependent both on a pulse sequence which is dependent on the transmission signal Sin and on an interference signal which is injected into the channel externally. This signal KS present on the channel is fed back to the transmission apparatus 1 in order to be able to detect interference signals on the channel, as will be explained below.

A first exemplary embodiment of an inventive method for transmitting a transmission signal Sin via a channel is explained below with reference to example time profiles for a transmission signal Sin, for a pulse sequence PS which is generated by the transmission apparatus 10 on the basis of the transmission signal Sin and is output to the channel, and for a channel signal KS which can be detected on the channel.

The transmission signal Sin shown in FIG. 2 is a bivalent transmission signal which alternately assumes a first signal level P1 and a second signal level P2. This transmission signal to be transmitted via the channel is, by way of example, a control signal for a load (not shown in more detail) arranged at the receiver end and is used for turning on or turning off this load, for example.

On the basis of this bivalent transmission signal Sin, the inventive method shown in FIG. 2 involves a pulse sequence being generated which has a positive pulse when the signal level of the transmission signal Sin rises from the first level P1 to the second level P2, that is to say when there is a rising edge of this transmission signal Sin, as is the case at times t1 and t5 in FIG. 2. Upon every rising edge of the transmission signal Sin, a pulse sequence comprising a positive pulse is therefore generated. These pulses generated in the transmission apparatus shown in FIG. 1 bring about a corresponding detectable signal pulse on the channel, with this signal pulse PS which can be detected on the channel possibly appearing with a delay with respect to the pulse in the pulse signal PS or appearing smooth, depending on the channel properties, although this is not taken into account in the illustration shown in FIG. 2.

At time t2, an interference pulse, in the example a negative interference pulse, appears on the channel in the signal profile shown in FIG. 2. This interference pulse is detected and, when the interference pulse has subsided, the pulse transmitted at time t1 is repeated. This corrects misinformation at the receiver end. This is because the receiver cannot distinguish whether a pulse on the channel results from a signal which is output by the transmission apparatus or from an interference pulse. If the receiver is designed to put a load into a particular operating state when a negative pulse is received via the channel, then the negative interference pulse appearing at time t2 could bring about this actuation of the load. The correct pulse, which is repeated after the interference pulse has subsided and is dependent on the transmission signal Sin, ensures that the load is put back into the correct operating state if an incorrect state change has occurred on account of the interference pulse. The positive pulse is transmitted again immediately after the interference pulse has subsided or with a slight time delay after the interference pulse has subsided.

In the exemplary embodiment shown in FIG. 2, a negative pulse is transmitted when the level of the transmission signal Sin falls from the second level P2 to the first level, that is to say upon every falling edge of the transmission signal Sin, as shown at a time t3. Correspondingly, this negative pulse is transmitted again when an interference pulse or interference signal starting at time t4 has subsided, in order to avoid or to correct misactuation of the load as a result of the interference signal.

The transmission method illustrated in FIG. 2 involves the use of just one transmission channel for the data transmission, with this channel being used to transmit a positive pulse upon every rising edge of the transmission signal Sin and to transmit a negative pulse upon every falling edge of the transmission signal Sin, and the positive pulse being repeated following detection of an interference pulse on the channel for as long as the transmission signal Sin maintains its level after a rising edge, and the negative pulse being repeated following detection of an interference pulse on the channel for as long as the transmission signal Sin maintains its level after a falling edge. If the transmission signal changes its state during interference, then a pulse or a correction pulse is transmitted, when the interference has subsided, which is associated with the new level of the transmission signal.

FIG. 3 illustrates an inventive method in which the transmission signal Sin is transmitted in pulse-code-modulated form, with a rising edge of the transmission signal Sin being converted into a first pulse sequence PS1 with two pulses, the interval of time between these two pulses being T1, by way of example. A falling edge of the transmission signal Sin is converted into a second pulse sequence PS2, with the interval of time between these pulses being T2, for example.

The duration of the pulse sequences PF1, PF2 is normally shorter than the duration for which the transmission signal Sin assumes the second signal level P2 or the first signal level P1 at consecutive times. In the case of the method shown in FIG. 3, detection of an interference pulse is followed by the first pulse sequence PF1 being repeated if the transmission signal Sin continues to be at the second signal level P2. Correspondingly, the second pulse sequence PF2 is repeated after an interference pulse has been detected on the channel, if the transmission signal Sin has the first signal level P1. If the transmission signal Sin has changed its level in the interim—during the occurrence of an interference signal—then, when the interference has subsided, a signal sequence is transmitted which is associated with the present level or state of the transmission signal Sin.

To give a better understanding of a further embodiment of an inventive method and of an inventive transmission apparatus, FIG. 4 illustrates a data transmission system for transmitting the transmission signal Sin via two separate channels, each of the channels having a transformer 31, 32 as a potential barrier. Connected to the two channels at the receiver end is a receiver circuit 21 which provides an output signal Sout on the basis of signals present on the channels, the receiver circuit 21 and a transmission apparatus 10 arranged at the transmitter end being matched to one another such that the output signal Sout matches the transmission signal Sin if the channel is free of interference. The transmission apparatus 10 is supplied with the transmission signal Sin, with the transmission apparatus comprising a first transmission apparatus 11 which generates a first pulse sequence PS1 on the basis of the transmission signal Sin and outputs it to the first channel, and the transmission apparatus 10 having a second transmission apparatus 12 which generates a second pulse sequence PS2 on the basis of the transmission signal Sin and outputs it to the second channel.

In addition, the first transmission apparatus 11 monitors the first channel, to which end the first transmission apparatus 11 is supplied with a signal KS1 which can be detected on the first channel. The second transmission apparatus monitors the second channel, with the second transmission apparatus 12 being supplied with a channel signal KS2 which can be detected on the channel. Preferably, the first and second transmission apparatuses are coupled to one another, as shown in FIG. 4. As a result of this, upon detection of an interference pulse on the first channel, the pulse sequence provided by the second transmission apparatus 12 can be transmitted again on the basis of a first refresh signal or actuating signal SRE1 generated by the first transmission apparatus 11, and the first pulse sequence provided by the first transmission apparatus 11 can be transmitted again to the first channel on the basis of a second refresh signal or actuating signal SRE2 which is provided by the second signal generating apparatus 12 and is dependent on detection of an interference pulse on the second channel. The pulse sequences PS1, PS2 generated by the first and second transmission apparatuses 11, 12 are preferably transmitted at staggered times.

While a pulse sequence resulting from the transmission signal Sin is being transmitted via one of the channels, this channel is disabled for detection of an interference pulse, in order to prevent a useful signal pulse from being incorrectly detected as an interference pulse. Since the first and second pulse sequences PS1, PS2 are generated and transmitted at staggered times, however, one of the two channels is always available for interference signal detection, with use being made of the insight that interference signals normally influence both channels at the same time.

FIG. 5 illustrates an inventive signal transmission method using two transmission channels, with example time profiles for the transmission signal Sin, for the first pulse sequence PS1, for the second pulse sequence PS2, for a signal KS1 present on the first channel and for a signal KS2 present on the second channel being shown below one another in FIG. 5.

In the case of the method shown in FIG. 5, upon every rising edge of the bivalent transmission signal Sin a pulse is generated by the first transmission apparatus 11 and is output to the first channel, as shown at times t1 and t7. This transmission pulse is transmitted again via the associated channel when an interference signal has been detected on one of the two channels. In the case of the time profile shown in FIG. 5, transmission of the pulse on the first channel is accompanied by the appearance of an interference pulse, which in the example is negative with respect to the pulse which is transmitted. This interference pulse corrupts the signal transmitted via the first channel, as shown using the profile for the signal KS1. The shape of the interference pulse becomes clear with reference to the time profile for the signal KS2. In the case of the inventive method, during the period of time during which a pulse is being transmitted via one of the two channels, no interference signal detection is carried out on this channel.

In the case of the example shown in FIG. 5, upon every falling edge of the transmission signal Sin a pulse is transmitted via the second channel, as shown at time t4 in FIG. 5. Pulses via the first channel and via the second channel are therefore transmitted at staggered times, which means that the second channel is used for interference signal detection during transmission of pulses via the first channel. Correspondingly, following detection of an interference pulse in the signal KS2 which is tapped off on the second channel, the pulse generated after the rising edge at time t1 is repeated at time t2 after the interference pulse has subsided. Although an interference pulse has appeared on both channels during transmission of the first pulse and has resulted in incorrect transmission of the first pulse, this error is corrected using the second channel, which is used exclusively for interference signal detection during transmission of a pulse via the first channel.

Following the transmission of a pulse, the first channel is also used for interference signal detection, so that the pulse transmitted via the first channel is also repeated when an interference signal is detected exclusively on the first channel, as shown from time t3 onward. When the interference pulse has subsided, the pulse resulting from the positive edge of the transmission signal Sin is transmitted again.

Correspondingly, during transmission of a pulse or of a pulse sequence which is dependent on the transmission signal Sin via the second channel, the first channel is used exclusively for interference signal detection, which means that the pulse transmitted via the second channel is also transmitted again if an interference signal greatly interferes with the second channel during transmission of the pulse. In this context, it is assumed that interference pulses normally concern both channels at the same time. When a pulse or a pulse sequence has been transmitted via the second channel, the second channel is also used for interference signal detection, which means that the pulse transmitted via the second channel is also repeated if an interference signal is detected only on the second channel. In FIG. 5, such an interference pulse starts at time t6, by way of example. The pulse resulting from the falling edge of the transmission signal Sin is in this case transmitted again after this interference pulse has subsided.

It goes without saying that, in connection with the embodiment of the inventive method in which pulse sequences are transmitted via two mutually isolated channels, it is possible to use any pulse sequences which are dependent on the transmission signal Sin and, following detection of an interference signal or interference pulse on at least one of the two channels, are transmitted again via the associated channel.

In one modification of the method illustrated in FIG. 5, the first pulse generated after a level change in the transmission signal Sin or the first pulse sequence generated is delayed if, together with this level change, an interference signal or an interference pulse is detected on one of the two channels, and the first pulse or the first pulse sequence is not transmitted until after this interference signal has subsided.

FIG. 6 shows a detailed view of an exemplary embodiment of an inventive transmission apparatus as shown in FIG. 1 for carrying out a method as shown in FIG. 2 at the transmitter end.

The transmission apparatus comprises an input terminal for supplying the transmission signal Sin and is coupled to the channel by means of an output terminal, only one of the windings on the channel's transformer being shown in FIG. 6 for reasons of clarity.

The transmission apparatus comprises a driver circuit DRV having two transistors T1, T2 whose load paths are connected in series between a positive supply potential Vcc and a negative supply potential Vss, with a node which is common to the two transistors being connected to the channel. The potential on the channel can be pulled to positive potential or to negative potential using this driver circuit DRV, the potential on the channel being positive when the first transistor T1 connected to the positive supply potential Vcc is on and the second transistor T2 connected to the negative supply potential Vss is off. Correspondingly, the potential on the channel is negative when the second transistor is on and the first transistor T2 is off. The first transistor T1 is in the form of a bipolar transistor in the exemplary embodiment, while the second transistor T2 is a MOSFET. To provide actuating signals for the two transistors T1, T2, a pulse-generating circuit 110 is provided which provides a first pulse sequence PSH for actuating the first transistor T1 and a second pulse sequence PSL for actuating the second transistor T2. To convert the logic levels of these two pulse sequences PSH, PSL to suitable potentials for actuating the two transistors T1, T2, these pulse sequences are supplied to driver circuits DT1 and DT2, respectively, the driver circuit DT1 being connected to the control connection on the first transistor T1, and the driver circuit DT2 being connected to the control connection on the second transistor T2.

To provide the pulse sequences PSH, PSL, the pulse-generating circuit 110 comprises a number of logic components which are explained below.

The pulse sequence PSH for actuating the first transistor T1 is available at the output of a first NOR gate NO1, and the pulse sequence PSL for actuating the second transistor T2 is available on a second NOR gate NO2. The first NOR gate NO1 is supplied with an output signal from an upstream NAND gate NA1, with the output signal from the first NAND gate NA1 delayed by means of a delay element DL1 and inverted by means of a Schmitt trigger ST1, and with a turn-on signal PON. Correspondingly, the second NOR gate NO2 is supplied with the output signal from a second NAND gate NA2, with the output signal from this NAND gate NA2 delayed by means of a delay element DL2 and inverted by means of a Schmitt trigger, and with the turn-on signal PON.

The first NAND gate NA1 is supplied with the transmission signal Sin and with an actuating signal or refresh signal SRE. This actuating signal SRE normally has the level of a logic 1, provided that no interference pulse is detected on the channel, as will be explained below. The second NAND gate NA2 is supplied with the transmission signal Sin inverted by means of an inverter IN1 and likewise with the actuating signal SRE.

The way in which this pulse-generating circuit 110 works is explained briefly below, with reference being made to the time profile for the pulse sequences PSH, PS7 in FIG. 7, in which the turn-on signal PON, the transmission signal Sin, the pulse sequence PSH and the pulse sequence PSL are shown below one another in the top part.

It will first be assumed that the actuating signal SRE has the level of a logic 1 and that in addition the turn-on signal PON, which is low-active, has the level of a logic 0. If the turn-on signal Sin likewise assumes the level of a logic 0 or the lower signal level P1, then the output of the NAND gate NA1 produces the level of a logic 1, which, together with the level of the turn-on signal PON via the NOR gate NO1, gives the level of a logic 0 at the output of the NOR gate NO1. The output of the second NOR gate NO2 likewise produces the level of a logic 0 where the input signal Sin has the level of a logic 0. In this case, the output of the NAND gate NA2 produces the level of a logic 0. The delay element DL2 is designed to pass on level changes from a logic 0 to a logic 1 without a delay and to pass on level changes from a logic 1 to a logic 0 with a delay time of τ1. Assuming that the low level at the output of the NAND gate NA2 has already been produced for longer than this delay time τ1, the output of the inverting Schmitt trigger ST2 produces a high level, which means that the output of the NOR gate NO2 produces a low level.

If the input signal Sin changes from the low level (logic 0) to the high level (logic 1), then the level at the output of the first NAND gate NA1 changes from a logic 1 to a logic 0. Like the delay element DL2, the delay element DL1 is designed to pass on level changes from logic 1 to logic 0 with a delay time of τ1 and to pass on level changes from logic 0 to logic 1 without a delay. The output of the inverting Schmitt trigger ST1 following the change in the level of the output signal from the NAND gate NA1 thus continues to produce a low level for a period τ1, which means that the output of the NOR gate NO1 following a change in the level of the transmission signal Sin from low to high produces a pulse for a period τ1, as shown in FIG. 7 on the rising edge of the transmission signal Sin. Correspondingly, the output of the NOR gate NO2 following a falling edge of the transmission signal Sin produces a pulse of duration τ1 for a period τ2.

Figure 7:
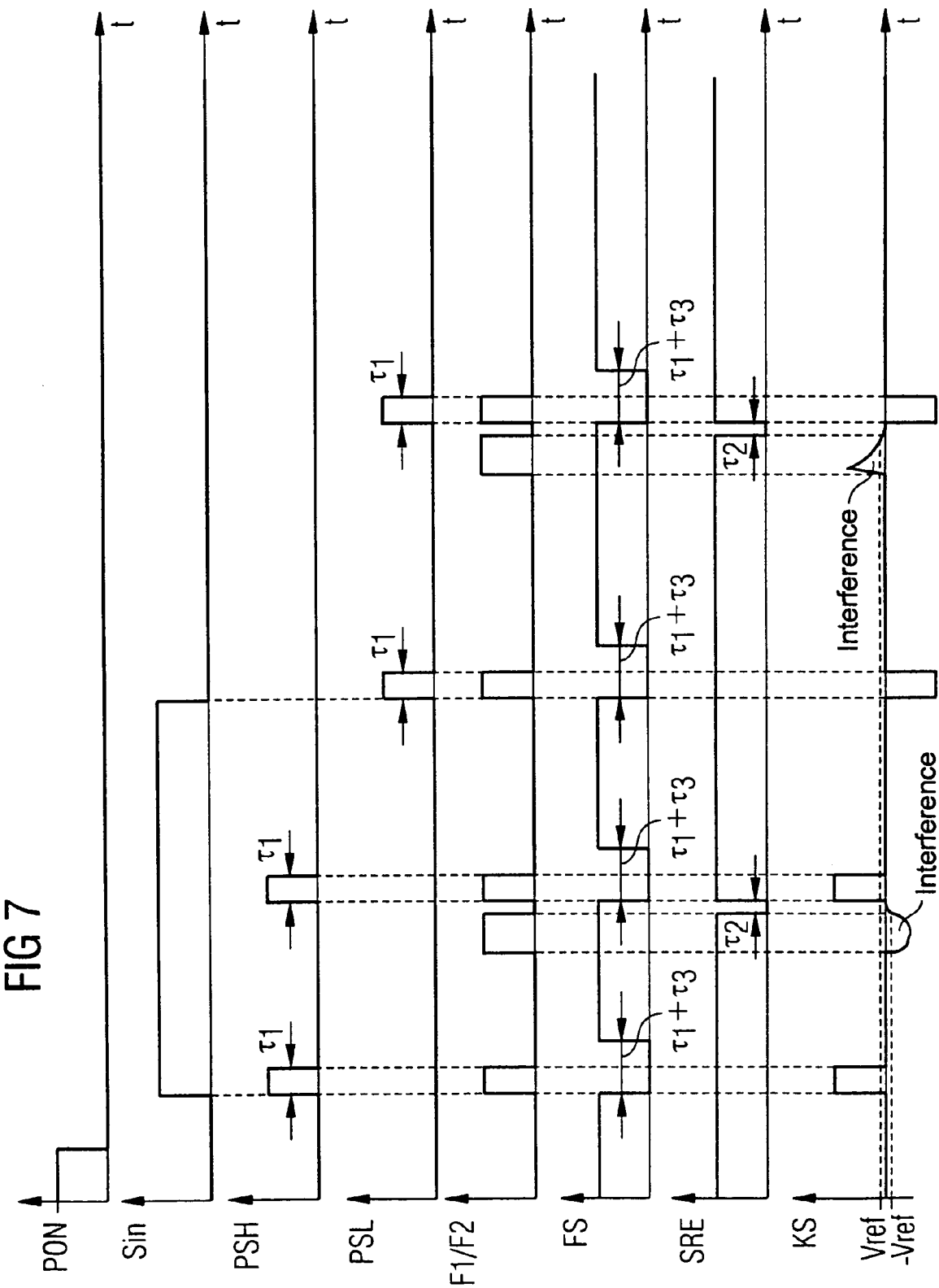
FIG. 7 shows exemplary time profiles for some of the signals arising in the transmission apparatus shown in FIG. 6.

Upon every rising edge of the transmission signal Sin, the first transistor T1 turns on by virtue of the pulse in the pulse sequence PSH, in order to draw the channel to a positive potential, as becomes clear from the channel signal KS which can be tapped off on the channel and whose time profile is shown at the bottom in FIG. 7. If the first transistor T1 is subsequently off, the output of the driver circuit DRV is at high impedance. The driver circuit DRV is a "tristate driver circuit" which can assume three states, a first state, in which the first transistor T1 is on and the second transistor T2 is off, which means that the output of the driver circuit DRV produces a positive supply potential Vcc, a second state, in which the second transistor T2 is on and the first transistor T1 is off, which means that the output of the driver circuit DRV produces a negative potential Vss, and a third state, in which both transistors T1, T2 are off, which means that the output of the driver circuit DRV is at high impedance.

A pulse of the signal PSL turns on the second transistor T2, as a result of which the channel is drawn to negative potential, as likewise becomes clear from the channel signal KS which can be tapped off on the channel.

In general, the first path in the pulse-generating circuit 110, containing the first NAND gate NA1, the delay element DL1 and the Schmitt trigger ST1 and also the NOR gate NO1, generates a pulse of duration τ1 when one of the two input signals on the NAND gate NA1 rises from the level of a logic 0 to the level of a logic 1, while the other of the two input signals maintains the level of a logic 1. Correspondingly, the second path in the pulse-generating circuit 110, containing the second NAND gate NA2, the delay element DL2, the Schmitt trigger ST2 and the NOR gate NO1, generates a pulse of duration τ1 when one of the two input signals on the NAND gate NA2 changes from the level of a logic 0 to the level of a logic 1, while the other of the two input signals maintains the level of a logic 1. The first path in the pulse-generating circuit 110 thus also generates a pulse of duration τ1 when the input signal Sin assumes the level of a logic 1 and the refresh signal SRE rises from a low level to a high level. Correspondingly, the second path generates a pulse of duration τ1 for actuating the second transistor T2 when the input signal Sin assumes the value of a logic 0 and the refresh signal SRE rises from the value of a logic 0 to the value of a logic 1.

This refresh signal or actuating signal is generated by an actuating-signal-generating circuit 100 as stipulated by an interference signal detection signal provided by a detector circuit DET, the refresh signal SRE falling to a low level for a period τ2 following detection of an interference signal so as subsequently to rise to a high level and to prompt fresh generation of a pulse by the pulse-generating circuit 110, as explained below.

The detector circuit DET is coupled to the channel and has a comparator arrangement, with a first comparator K1 and a second comparator K2, which is used to compare the channel signal with a positive reference value Vref and with a negative value −Vref. Output signals F1, F2 from these comparators K1, K2 are supplied to a NOR gate NO3, these two output signals F1, F2 assuming the value of a logic 0 for as long as the channel signal K1 is within a range prescribed by the reference values −Vref and Vref. The interference signal detection signal EMI is then accordingly at the value of the level of a logic 1. If the magnitude of the channel signal KS exceeds one of these two reference values, then one of the comparator output signals F1 or F2 is high, while the other is low, which means that the interference signal detection signal EMI assumes the value of a logic 0, as is likewise illustrated in FIG. 7, where the comparator output signals F1, F2 are illustrated together in the timing diagram in this case.

In the detector circuit DET, it is not possible to distinguish in the example whether the rise or fall in the channel signal KS to a value which is outside of the range is brought about by an interference signal or one of the transistors T1, T2 turned on by the pulses PSH, PSL, which means that the interference detection signal EMI also assumes the value of a logic low level for a useful signal pulse. To prevent such a useful pulse from being detected as an interference signal, the actuating signal SRE is generated in the actuating-signal-generating circuit on the basis of an enable signal FS which is dependent on the pulse sequences PSH, PSL. This enable signal FS is supplied to a NAND gate NA3 whose output produces the actuating signal SRE. The NAND gate NA3 is also supplied with the interference signal detection signal EMI directly and with the interference signal detection signal EMI delayed by means of a delay element DL4 and inverted by means of a Schmitt trigger ST4. The delay element DL4 is designed to pass on level changes in the interference signal detection signal EMI from a low level to a high level delayed by a delay time T2, while level changes from a high level to a low level are passed on without any delay. If the level of the interference signal detection signal EMI thus changes from a low level to a high level when an interference signal or else a useful signal has subsided, then this level change is passed on only with a delay, which means that the interference signal detection signal EMI and the signal produced at the output of the Schmitt trigger ST4 do not differ for a period T2 after this level change, with both assuming the value of a logic 1.

If the enable signal FS also has the value of a logic 1 during this period, then the actuating signal SRE falls to the level of the logic 0 for this period $\tau 2$ so as to prompt generation of a refresh pulse of duration $\tau 1$ in the manner described above when subsequently rising to a logic 1.

Regardless of a level change in the interference signal detection signal EMI, the actuating signal SRE maintains the level of a logic 1 when the enable signal FS assumes the level of a logic 0. The enable signal FS is generated by means of a logic arrangement which has a NOR gate NO4, a delay element DL3 connected downstream of the NOR gate NO4, a Schmitt trigger ST3 connected downstream of the delay element DL3, and an inverter IN2 connected downstream of the Schmitt trigger ST3, with the enable signal FS being produced at the output of the inverter IN2. The NOR gate NO4 is supplied with the pulse sequences PSH, PSL. The delay element DL3 is designed to pass on level changes at the output of the NOR gate NO4 from low to high delayed by a delay time $\tau 3$. Every pulse in the pulse sequences PSH, PSL causes this logic circuit to prompt a low level for the enable signal FS for a period $\tau 1+\tau 3$ in order to disable the NAND gate NA3 during this period and thus to prevent a useful pulse from being followed by generation of a corresponding low pulse for the actuating signal and by the useful pulse being transmitted again.

A low pulse for the actuating signal, which stipulates that the pulse-generating circuit 110 can generate a pulse again and output it to the channel, can thus be generated only when no useful pulse is currently being transmitted via the channel, this being ensured for the transmission apparatus shown in FIG. 6 by virtue of the NAND gate at the output of the actuating-signal-generating circuit being disabled for the period $\tau 1+\tau 3$ after the start of the pulse PSH or PSL. Although the detector circuit detects a potential change on the channel during this period, the detected potential change is not used to generate a low pulse for the actuating signal, since the actuating-signal-generating circuit 100 is disabled.

Instead of the actuating-signal-generating circuit 100, it is also possible to disable the detector circuit DET in order to prevent a useful pulse from being detected as an interference signal during transmission of this useful pulse.

Figure 8:
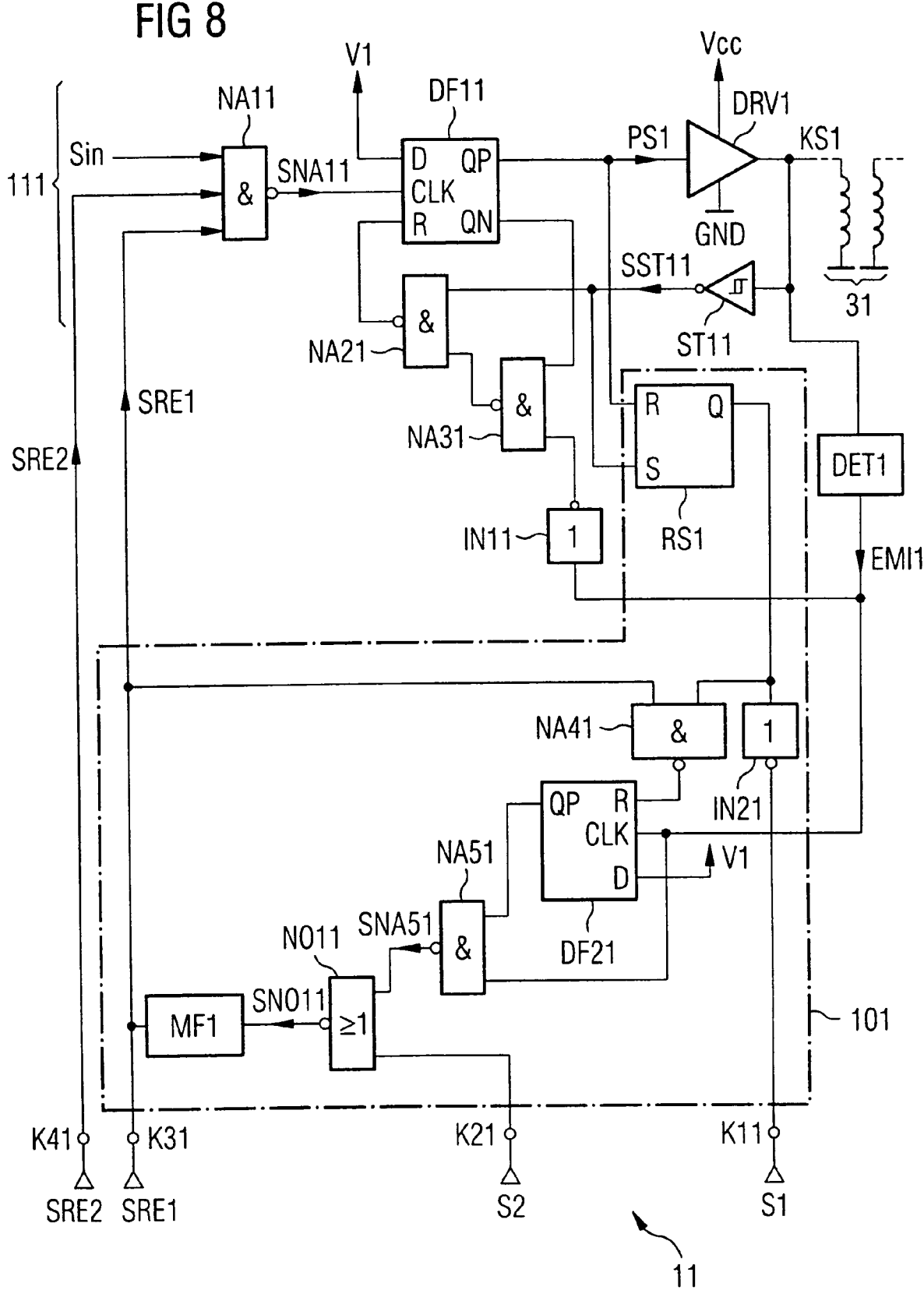
FIG. 8 is a schematic block diagram of a first pulse-generating circuit and a first interference signal detection circuit in a transmission apparatus for carrying out a method as shown in FIG. 5.
Figure 9:
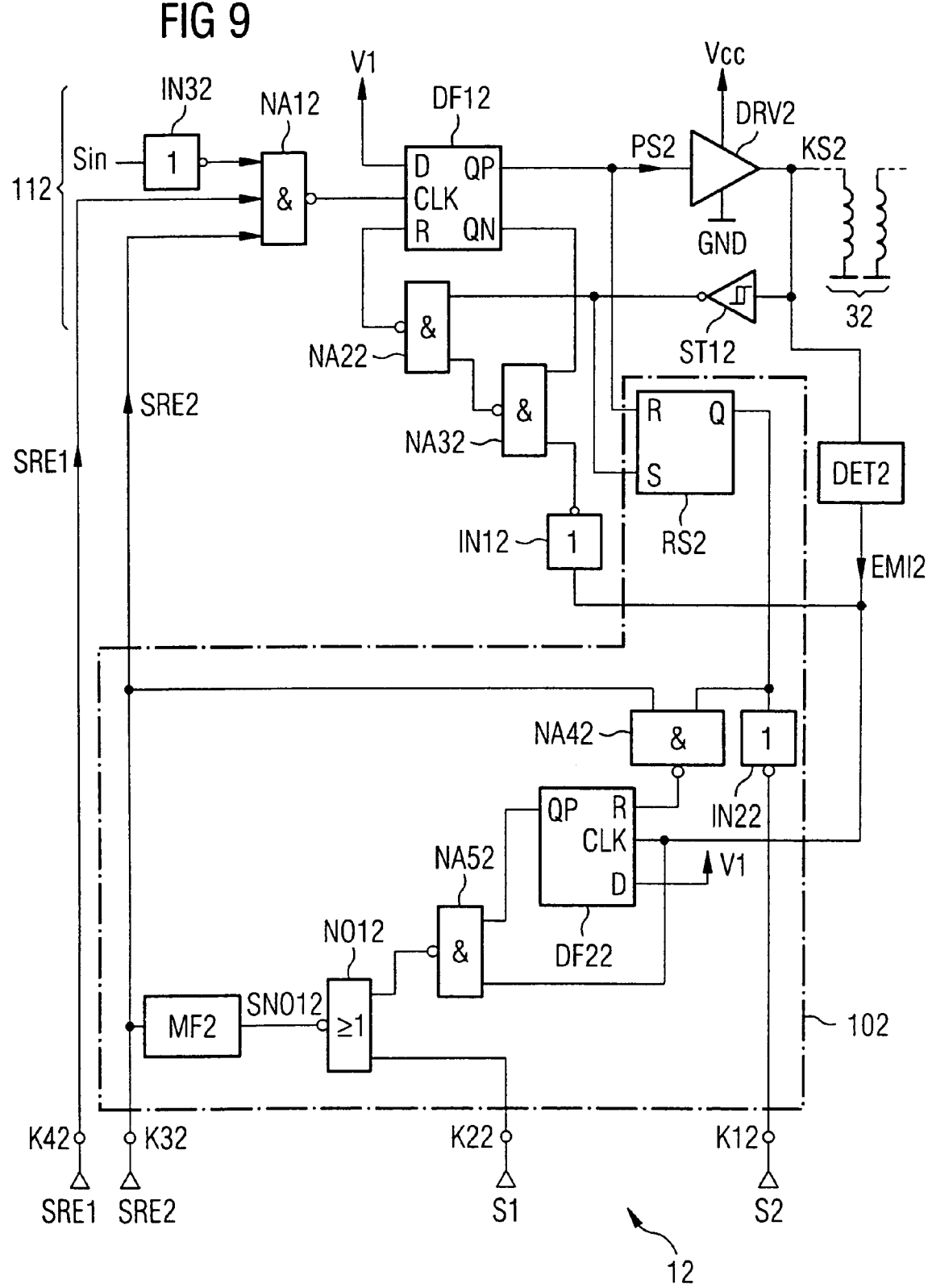
FIG. 9 is a schematic block diagram of a second pulse-generating circuit and a second interference signal detection circuit in a transmission apparatus for carrying out a method as shown in FIG. 5.

FIGS. 8 to 11 are subsequently used to illustrate a transmission apparatus 10 for carrying out an inventive transmission method as shown in FIG. 5. FIG. 8 shows a block diagram of the first transmission apparatus 11 shown in FIG. 4, and FIG. 9 shows a block diagram of the transmission apparatus 12 shown in FIG. 4.

The two transmission apparatuses 11, 12 are of identical design and differ only in that the transmission apparatus 11 is supplied with the input signal Sin directly, and the transmission apparatus 12 is supplied with the input signal Sin inverted by means of an inverter IN31. To illustrate the identical design of the transmission apparatuses 11 and 12, the references for corresponding components and corresponding signals in the illustrations shown in FIGS. 8 and 9 differ only in their last digit, the references for components and signals associated with the first transmission apparatus 11 ending in the digit 1 and the references for components and signals associated with the second transmission apparatus 12 ending in the digit 2.

The first transmission apparatus 11 has an output terminal K31 providing the first actuating signal SRE1, which is supplied to a connection terminal K42 on the second transmission apparatus 12. Correspondingly, the second transmission apparatus has an output terminal K32 providing the second actuating signal SRE2, which is supplied to a connection terminal K41 on the first transmission apparatus 11.

Besides the actuating signals SRE1, SRE2, which are also shown in FIG. 4, the two transmission apparatuses 11, 12 respectively deliver a status signal S1 or S2. A first status signal S1 from the first transmission apparatus is available on a first output terminal K11 and is supplied to an input terminal K22 on the second transmission apparatus 12. Correspondingly, the second transmission apparatus 12 provides a second status signal 32 on an output terminal K12, and this status signal is supplied to an input terminal K21 on the first transmission apparatus 11.

On account of the identical design of the two transmission apparatuses, the description below is limited to describing the transmission apparatus 11 in FIG. 8. Time profiles for selected signals shown in the transmission apparatus 11 in FIG. 8 are illustrated in FIG. 11 to give a better understanding of the manner of operation.

The transmission apparatus 11 comprises a NAND gate NA11 which is supplied with the transmission signal Sin, with the first actuating signal SRE1 generated in the first transmission apparatus 11, and with the second actuating signal SRE2 generated in the second transmission apparatus 12. As will be explained, the two actuating signals SRE1, SRE2 are generated such that they assume the value of a logic 1 if no interference signal is detected on one of the two channels, and they fall to a low level for a prescribed period when an interference signal has been detected. In the absence of interference, the output of the NAND gate NA11 produces an output signal SNA11 with a logic high level if the input signal Sin has the level of a logic 0. The output signal from the NAND gate NA11 is supplied to the clock input of a downstream D-type flipflop DF11, the D-input of this flipflop being at a positive logic potential V1. The noninverting output QP of this flipflop DF11 produces the first pulse sequence PS1, which is output via a driver circuit DRV1 to the channel, of which only the transformer 31 is shown in FIG. 8. By way of example, the driver circuit DRV1 is a conventional inverter which applies the channel to a positive supply potential Vcc or reference-ground potential GND as stipulated by the pulse sequence PS1. It is not necessary to transmit a negative pulse during data transmission via two channels.

If the input signal Sin changes from a low level to a high level, then the output signal SNA11 from the NAND gate NA11 accordingly changes to a low level, as illustrated in FIG. 11. Upon the falling edge of the gate signal SNA11, the D-type flipflop DF11 assumes the value of the logic potential V1, as a result of which the level at the noninverting output of the flipflop DF11 rises to the value of a logic 1, which means that a positive potential is applied to the channel via the driver DRV1.

A signal KS1 present on the channel is supplied to an inverting Schmitt trigger ST11, whose output signal SST11 is supplied via a NAND gate NA21 to the reset input R of the D-type flipflop DF11. If the signal KS1 rises above a threshold value prescribed by the Schmitt trigger ST11, then the output signal SST11 from the Schmitt trigger ST11 assumes a low level and resets the flipflop DF11 via the NAND gate NA21, as a result of which the level at the flipflop's noninverting output QP falls to a low level. When the high pulse produced at the output QP of the flipflop is generated, use is made of the fact that, particularly during signal transmission via a channel which contains an inductive transformer, the potential on the channel follows the pulse PS1 only after a time delay, which means that the D-type flipflop DF11 is not reset until after this delay time, which determines the duration of the pulse. The duration of the pulse after a rising edge of the input signal Sin is thus prescribed by the channel properties and possibly by the delay times of the logic components. In this way, the pulse length of the transmission pulse PS1 and hence the poser consumption are automatically minimized. Delay times for the logic components are incidentally taken into account in the illustration shown in FIG. 1 only where they are necessary for the operation of the circuit arrangement.

The NAND gate NA11, the flipflop DF11, the Schmitt trigger ST11 and the NAND gate NA21 together form a pulse-generating circuit 111 which generates a pulse PS1 at the noninverting output of the D-type flipflop DF11, and outputs it to the channel via the driver DRV1, whenever one of the input signals on the NAND gate NA11, that is to say the transmission signal Sin or one of the two actuating signals SRE1, SRE2, rises from a low level to a high level, provided that the other two signals have a high level. In this case, the duration of the pulse generated is always the same and is dependent on the properties of the channel and on the delay times of the logic gates used.

The transmission apparatus 12 shown in FIG. 9 has a corresponding pulse-generating circuit 112 which comprises the inverter IN32, the NAND gate NA12, the flipflop DF12, the Schmitt trigger ST12 and the NAND gate NA22. In line with the manner of operation of the pulse-generating circuit shown in FIG. 8, this pulse-generating circuit 112 generates a pulse PS2 when the transmission signal Sin, which is inverted by the inverter IN32, falls from a high level to a low level, provided that the actuating signals SRE1, SRE2 have a high level. In addition, the transmission apparatus shown in FIG. 9 generates a pulse PS2 whenever the transmission signal Sin has a logic low level and the level of one of the two actuating signals SRE1, SRE2 changes from a low level to a high level.

The transmission apparatus 11 shown in FIG. 8 also comprises an interference signal detection circuit having a detector circuit DET1 and an actuating-signal-generating circuit 101, which provides the first actuating signal SRE1. The design of the detector circuit DET1 can be equivalent to the design of the detector circuit DET shown in FIG. 6, with the reference potentials being suitably chosen on the basis of the potential conditions on the channel such that any signals on the channel, be they useful signals or interference signals, can be detected. Whether a potential change detected on the channel is the result of a useful signal or of an interference signal is decided in the actuating-signal-generating circuit 101. The detector circuit DET1 delivers an interference signal detection signal EMI1 which assumes the value of a logic 0 if the channel signal K11 assumes a value outside of a range prescribed by the reference potentials used in the detector circuit. Regardless of whether the channel signal KS1 is situated outside of this range as a result of a useful pulse or as a result of an interference pulse, the interference signal detection signal or channel detection signal EMI1 assumes the value of a logic 0.

The interference signal detection signal EMI1 is supplied to the clock input CLK on a further D-type flipflop DF21, whose D-input is at the positive logic potential V1. This flipflop DF21 takes on the logic potential V1 upon the falling edge of the interference signal detection signal EMI1, which means that the noninverting output QP produces the value of a logic 1. The interference signal detection signal EMI and the output signal from the flipflop DF21 are supplied to a NAND gate NA51. The output signal from this NAND gate NA51 remains at the level of a logic 1 for as long as the output signal from the flipflop DF21 and the interference signal detection signal EMI1 differ, that is to say for as long as a signal is detected on the channel. If the interference signal detection signal EMI1 rises, after this signal present on the channel has subsided, to the value of a logic 1, then the output signal from the NAND gate SNA51 assumes the value of a logic 0, as illustrated in FIG. 11.

The output signal SNA51 from the NAND gate NA51 is supplied to a NOR gate NO11 together with the status signal S2 from the second transmission apparatus 12. This status signal S2, which is generated on the basis of the status signal S1 (yet to be explained) from the transmission apparatus 11, assumes the level of a logic 0 if no data transmission is taking place via the second channel. In this case, when the signal detected on the channel ends, that is to say when the interference signal detection signal EMI1 rises to the value of a logic 1, the output signal SNO11 from the NOR gate NO11 changes to the level of a logic 1, as illustrated in FIG. 11.

Figure 10:
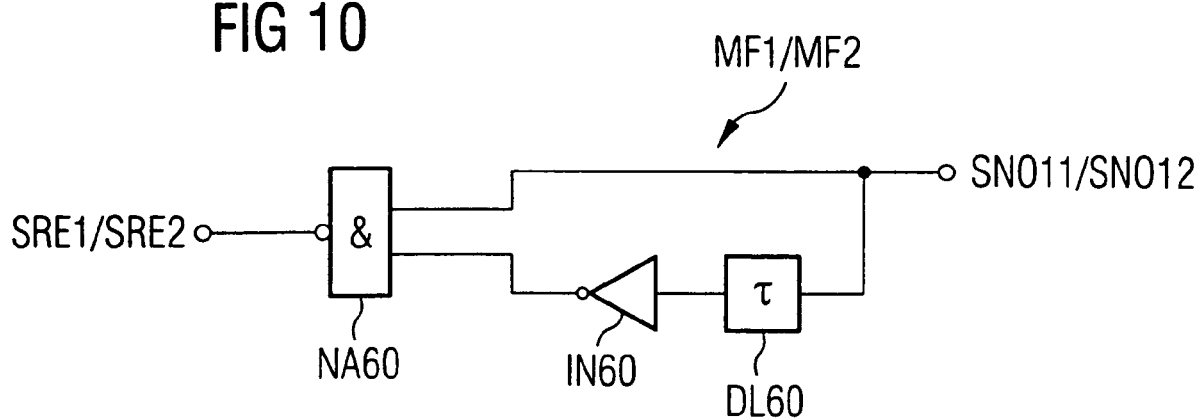
FIG. 10 is a block diagram of an exemplary embodiment of a monoflop as shown in FIGS. 8 and 9.

The output signal SNO11 from the NOR gate NO11 is supplied to a monoflop MF1, whose design corresponds to that shown in FIG. 10, for example. This monoflop comprises a NAND gate NA60, to which the signal SNO11 is supplied first directly and secondly delayed by means of a delay element DL60 and inverted by means of an inverter IN60. The monoflop MF1 thus generates, upon every rising edge of the output signal SNO11, an actuating signal SRE1 which assumes the level of a logic 0 upon every falling edge of the signal SNO11 for a period τ.

When the actuating signal SRE1 falls to the level of the logic 0, the output signal from the NAND gate NA11 rises to the level of a logic 1, and upon the next falling edge of this signal SNA11 after the delay time τ the level at the noninverting output QP of the flipflop DF11 again rises to a high level in order to generate a repeated pulse which is output to the channel via the driver DRV1.

As explained, the interference signal detection signal does not distinguish between interference signal and useful signal on the channel. To prevent a useful pulse transmitted via the channel, which useful pulse is also detected by the detection circuit DET1, from being incorrectly interpreted as an interference pulse and resulting in the generation of a low pulse for the actuating signal SRE1, and hence in pulse repetition, the example is provided with an RS flipflop RS1 whose reset input R is connected to the noninverting output of the flipflop DF11 and whose set input is connected to the output of the Schmitt trigger ST11. The noninverting output of the flipflop RS1 is connected to the reset input of the D-type flipflop DF21 via a NAND gate NA41. The flipflop RS1 is reset upon every rising edge of the pulse sequence PS1 and resets the D-type flipflop DF21 via the NAND gate NA41, so that a low level, resulting from transmission of the useful pulse, of the interference signal detection signal EMI1 cannot change the level of the actuating signal SRE1. The RS-type flipflop RS1 and hence the D-type flipflop DF21 remain reset until the Schmitt trigger ST11 sets the flipflop RS1 and resets the D-type flipflop DF11. Only when pulse transmission via the first channel has ended can a potential change, detected by the detector circuit DET1, on the channel bring about a change to the signal level of the actuating signal SRE1 in order to result in fresh pulse generation.

The NAND gate NA41 is supplied not only with the output signal from the flipflop RS1 but also with the actuating signal SRE1, as a result of which the D-type flipflop DF21 is reset whenever a low pulse is generated for the actuating signal SRE1, in order to start fresh interference signal detection.

The inventive transmission apparatus 11 generates a low pulse for the actuating signal SRE1, resulting in repetition of the pulse PS1, whenever a potential change is detected on the channel, potential changes during transmission of a useful pulse being masked out, so that they cannot result in a low pulse being generated for the actuating signal SRE1.

The output of the RS-type flipflop RS1 is also connected to an inverter IN21 whose output provides the status signal S1. This status signal S1 assumes a high level for as long as the flipflop RS1 is set, that is to say for as long as a useful pulse is being transmitted. The status signal S2 in the second transmission apparatus 12 is generated in a corresponding manner and assumes the value of a logic 1 for as long as a useful pulse is being transmitted by means of the second transmission apparatus.

As already explained above, the status signal S2 prevents a low pulse from being generated for the actuating signal SRE1 for as long as it assumes the value of a logic 1. Since the first actuating signal SRE1 prompts both repetition of a useful pulse on the first channel and repetition of a useful pulse on the second channel, the status signal S2 generated by the second transmission apparatus ensures that no low level is generated for the first actuating signal SRE1 during the period in which pulse transmission is currently taking place on the second channel, in order thus to prevent a refresh pulse from being generated at the same time as a useful pulse is being transmitted. The low pulse for the actuating signal SRE1 is not generated until after the status signal S2 has assumed a low level again, that is to say after data transmission on the second channel has ended.

Since the pulse sequences PS1, PS2 are generated with a time stagger in the case of the transmission apparatus shown in FIGS. 8 and 9, one of the two channels is always available for interference signal detection, with an interference pulse detected on one of the two channels not resulting in repetition of the useful pulse on the other of the two channels until useful pulse transmission has ended on this other one of the two channels.

The output signal SST11 from the Schmitt trigger ST11 is supplied to the reset input R on the D-type flipflop DF11 via a NAND gate NA21, the other input of this gate NA21 being supplied with the output signal from a further NAND gate NA31, whose input signals supplied are the signal produced at the inverting output of the flipflop DF11 and the interference signal detection signal EMI1 inverted by means of an inverter IN11. This arrangement containing the inverter IN11 and the gates NA21, NA31 "disables" the flipflop DF11 while an interference signal is present by virtue of the flipflop remaining permanently reset, and thereby prevents useful signals from being output to the channel during interference. The useful signal is thus not generated, triggered by a low pulse in the signal SRE1, and transmitted to the channel until after the interference has subsided.

In the case of the transmission apparatuses shown in FIGS. 8 and 9, the useful information to be transmitted is held in a respective pulse which is generated and transmitted via a first or second channel on the basis of the transmission signal. This pulse is transmitted again following detection of an interference signal on the channel. It is naturally also possible for a modified pulse-generating circuit (not shown in more detail) to generate and transmit longer pulse sequences on the basis of one or more transmission signals, this pulse sequence likewise being transmitted again upon detection of an interference signal.

Figure 12:
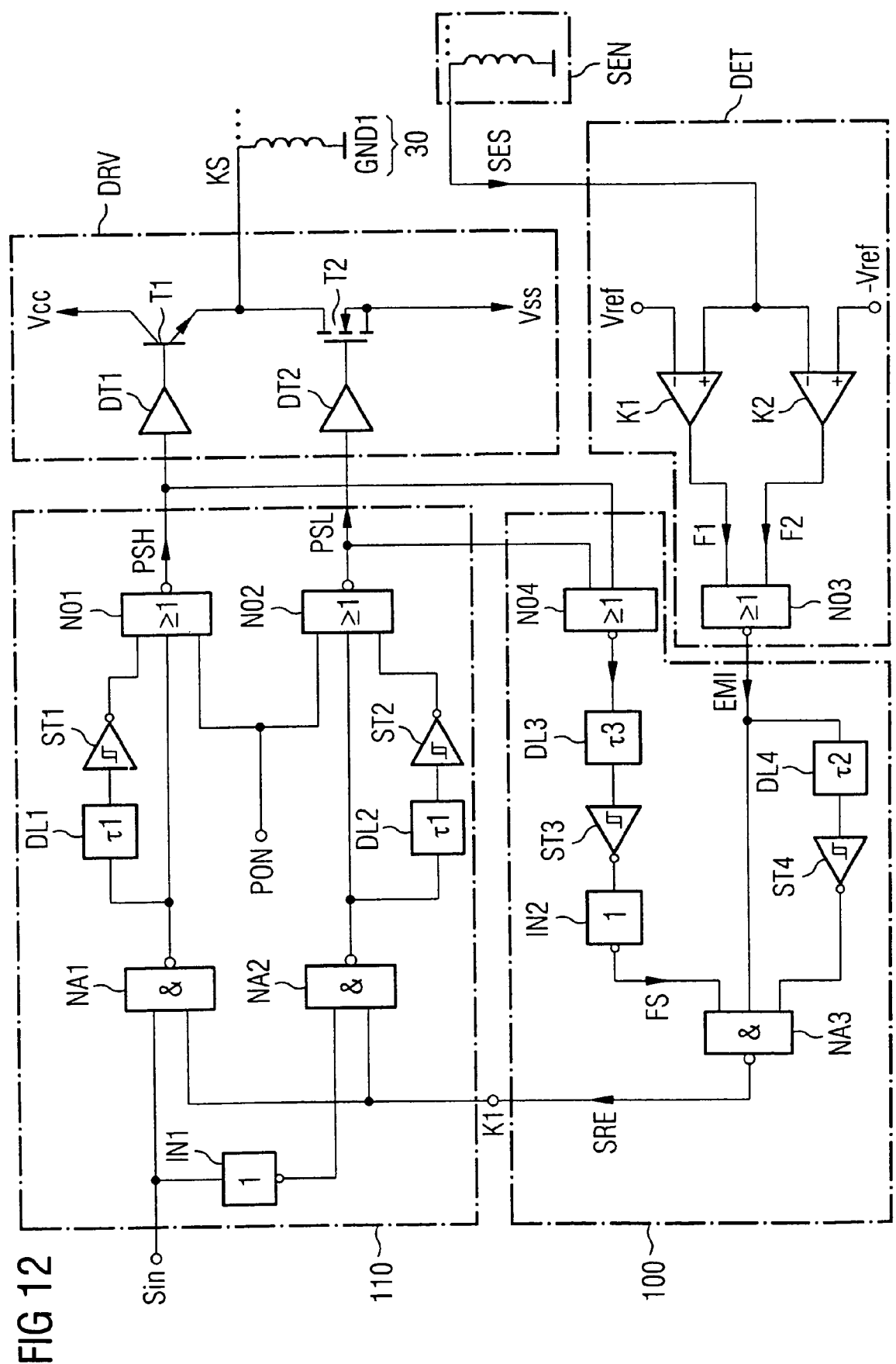
FIG. 12 is a schematic block diagram of a further exemplary embodiment of a transmission apparatus.

For the exemplary embodiments illustrated up to now, it is assumed that the channels are used both for signal transmission and for interference signal detection. In another embodiment, interference signal detection is carried out by providing a sensor which is used exclusively for interference signal detection and not for useful signal transmission. FIG. 12 shows an exemplary embodiment of a transmission apparatus for carrying out such a method. This transmission apparatus is a modification of the apparatus shown in FIG. 6 and differs therefrom in that interference signal detection is carried out by providing a sensor SEN to which the detection circuit DET instead of the channel is connected. The detection circuit evaluates a sensor signal SES in the manner explained above for the channel signal KS, in order thereby to prompt transmission of a correction pulse when an interference pulse is detected.

The sensor SEN is produced adjacently to the transmission channel and is designed such that corresponding interference signals are brought about in it as in the channel in the case of externally applied interference. In the simplest case, the sensor comprises a line which runs parallel to the transmission channel and may also contain a transformer, in order to simulate the transmission channel as accurately as possible using the sensor SEN.

Interference signal detection using the sensor SEN can be used as an alternative or in addition to the interference signal detection on the transmission channel. Thus, by way of example, a transition apparatus as shown in FIG. 8, which monitors interference on the transmission channel, can be complemented by the use of a sensor arrangement for ascertaining interference signals on the channel which supplies a further actuating signal (not shown in more detail) to the NAND gate NA11.

In the case of interference signal detection, be it on the transmission channel or on the sensor, it is not possible to ascertain the cause of the interference on the channel.

In the case of one embodiment of the inventive method, provision is therefore made for "interference" or "interference pulses" to be injected into the channel at the receiver end at regular or irregular intervals of time or upon triggering by particular events, so as to provoke repeated transmission of a transmission pulse. The receiver is then always able to request the present transmission pulse or the state of the transmission signal, unless externally caused interference arises.

Figure 13:
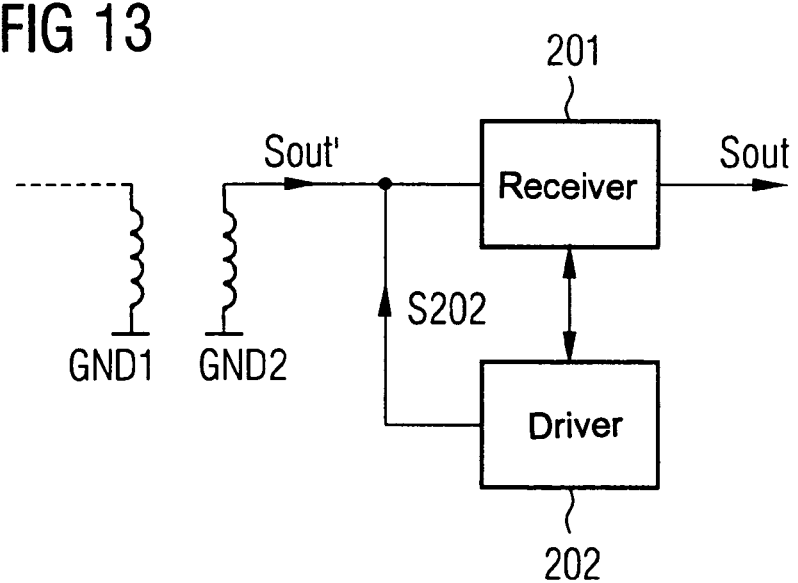
FIG. 13 is a diagram of an exemplary embodiment of a receiver apparatus.

FIG. 13 shows an exemplary embodiment of a suitable receiver apparatus 2 which is connected to the channel. The receiver apparatus comprises a receiver 201 which is connected to the channel and converts the signals detected on the channel into the output signal. In addition, the receiver apparatus comprises a driver circuit 202 which is connected to the channel and emits quasi interference signals to the channel in order to provoke repetition of the transmission pulse or of the transmission pulse sequence at the transmitter end. By way of example, the driver circuit is a tristate driver circuit after the fashion of the driver circuit DRV in FIG. 6 or 12. The receiver 201 and the driver circuit 202 are coupled to one another, as a result of which the receiver is able to trigger the emission of a quasi interference pulse S202 if, by way of example, a received signal Sout' cannot be unambiguously converted into the signal Sout. In addition, the driver 202 disables the receiver when a quasi interference pulse is emitted so that such a pulse cannot be incorrectly received as a useful pulse.

The provocation of fresh transmission of a useful pulse or of a useful pulse sequence works particularly in the case of channels which contain a transformer, since transformers are bidirectional components, which means that the signals generated at the receiver end are transmitted to the transmitter and are detected there as interference signals, which triggers fresh transmission of the useful signal.

I claim:

1. A transmission apparatus, comprising:
an input terminal for receiving at least one transmission signal, and at least one output terminal to be coupled to a transmission channel;
at least one pulse-generating circuit connected between said input terminal and said output terminal, said pulse-generating circuit having at least one actuating input and generating a pulse sequence with at least one pulse as predetermined by the transmission signal; and
an interference signal detection circuit connected between said output terminal of the transmission apparatus and said actuating input of said pulse-generating circuit, said interference signal detection circuit providing an actuating signal causing the pulse-generating circuit to generate the pulse sequence again as stipulated by the actuating signal.

2. A transmission apparatus, comprising:
an input terminal for receiving at least one transmission signal, and at least one output terminal to be coupled to a transmission channel;
at least one pulse-generating circuit connected between said input terminal and said output terminal, said pulse-generating circuit having at least one actuating input and generating a pulse sequence with at least one pulse as predetermined by the transmission signal;
an interference signal detection circuit connected to said pulse-generating circuit, said interference signal detection circuit providing an actuating signal causing the pulse-generating circuit to generate the pulse sequence again as stipulated by the actuating signal; and
a sensor disposed adjacent the transmission channel, and wherein said interference signal detection circuit is connected between said sensor and said actuating input of said pulse-generating circuit.

3. A transmission apparatus, comprising:
an input terminal for receiving at least one transmission signal, and at least one output terminal to be coupled to a transmission channel;
at least one pulse-generating circuit connected between said input terminal and said output terminal, said pulse-generating circuit having at least one actuating input and generating a pulse sequence with at least one pulse as predetermined by the transmission signal; and
an interference signal detection circuit connected to said pulse-generating circuit, said interference signal detection circuit providing an actuating signal causing the pulse-generating circuit to generate the pulse sequence again as stipulated by the actuating signal, said interference signal detection circuit having a detector circuit, connected to said output terminal of the transmission apparatus, and an actuating-signal-generating circuit, connected downstream of said detector circuit, in a signal flow direction, said actuating-signal-generating circuit providing the actuating signal in dependence on an output signal from said detector circuit.

4. The transmission apparatus according to claim 3, wherein said actuating-signal-generating circuit is configured to also generate the actuating signal in dependence on the at least one pulse sequence.

5. A transmission apparatus, comprising:
an input terminal for receiving at least one transmission signal, and at least one output terminal to be coupled to a transmission channel;
at least one pulse-generating circuit connected between said input terminal and said output terminal, said pulse-generating circuit having at least one actuating input and generating a pulse sequence with at least one pulse as predetermined by the transmission signal; and
an interference signal detection circuit connected to said pulse-generating circuit, said interference signal detection circuit providing an actuating signal causing the pulse-generating circuit to generate the pulse sequence again as stipulated by the actuating signal, wherein:
said at least one output terminal is one of two output terminals including a first output terminal, for coupling to a first channel, and a second output terminal, for coupling to a second channel;
said input terminal and said first output terminal having a first pulse-generating circuit connected therebetween, and said input terminal and said second output terminal having a second pulse-generating circuit connected therebetween;
said first output terminal and a control input of said first pulse-generating circuit having a first interference signal detection circuit for providing a first actuating signal connected therebetween; and
said second output terminal and a control input of said second pulse-generating circuit having a second interference signal detection circuit for providing a second actuating signal connected therebetween.

6. The transmission apparatus according to claim 5, wherein:
said first pulse-generating circuit is configured to provide the pulse sequence again as predetermined by the first actuating signal and as predetermined by the second actuating signal; and said second pulse-generating circuit is configured to provide the pulse sequence again as predetermined by the second actuating signal and as predetermined by the first actuating signal.

7. The transmission apparatus according to claim 6, wherein:
said first interference signal detection circuit is configured to generate the first actuating signal as predetermined by a second status signal indicating whether or not a second pulse sequence is being transmitted to the second channel; and
said second interference signal detection circuit is configured to generate the second actuating signal as predetermined by a first status signal indicating whether or not a first pulse sequence is being transmitted to the first channel.

8. The transmission apparatus according to claim 1, wherein said at least one pulse-generating circuit is configured to generate the pulse sequence after a prescribed edge of the input signal.

9. A transmission apparatus, comprising:
an input terminal for receiving at least one transmission signal, and at least one output terminal to be coupled to a transmission channel;
at least one pulse-generating circuit connected between said input terminal and said output terminal, said pulse-generating circuit having at least one actuating input and generating a pulse sequence with at least one pulse as predetermined by the transmission signal; and
an interference signal detection circuit connected to said pulse-generating circuit, said interference signal detection circuit providing an actuating signal causing the pulse-generating circuit to generate the pulse sequence again as stipulated by the actuating signal, wherein said at least one pulse-generating circuit is configured to repeat the pulse sequence after a prescribed edge of the actuating signal and at a prescribed level of the input signal.

10. A signal transmission assembly, comprising:
a transmission apparatus according to claim 1; and
a receiver apparatus having a receiver coupled to the channel and a driver coupled to the channel and configured to output signals to the channel to be detected in said transmission apparatus as interference signals.

* * * * *